(12) United States Patent
Shan et al.

(10) Patent No.: US 12,492,211 B2
(45) Date of Patent: Dec. 9, 2025

(54) CRYSTALLINE FORM OF NITROGEN-CONTAINING TRICYCLIC COMPOUND AND USE THEREOF

(71) Applicant: SUNSHINE LAKE PHARMA CO., LTD., Guangdong (CN)

(72) Inventors: Yuefeng Shan, Dongguan (CN); Liang Chen, Dongguan (CN); Xinye Yang, Dongguan (CN); Xiaojun Wang, Dongguan (CN)

(73) Assignee: SUNSHINE LAKE PHARMA CO., LTD., Dongguan (CN)

( * ) Notice: Subject to any disclaimer, the term of this patent is extended or adjusted under 35 U.S.C. 154(b) by 811 days.

(21) Appl. No.: 17/779,452

(22) PCT Filed: Nov. 27, 2020

(86) PCT No.: PCT/CN2020/132141
§ 371 (c)(1),
(2) Date: May 24, 2022

(87) PCT Pub. No.: WO2021/104427
PCT Pub. Date: Jun. 3, 2021

(65) Prior Publication Data
US 2022/0389024 A1    Dec. 8, 2022

(30) Foreign Application Priority Data

Nov. 29, 2019 (CN) .......................... 201911200268.9

(51) Int. Cl.
*C07D 491/044*    (2006.01)

(52) U.S. Cl.
CPC ...... *C07D 491/044* (2013.01); *C07B 2200/13* (2013.01)

(58) Field of Classification Search
CPC ... C07D 491/044; C07B 2200/13; A61P 1/00; A61P 1/04; A61P 3/00; A61P 3/06; A61P 3/10; A61P 7/00; A61P 7/06; A61P 9/00; A61P 9/04; A61P 9/10; A61P 9/12; A61P 11/00; A61P 13/12; A61P 15/00; A61P 25/00; A61P 29/00; A61P 31/04; A61P 31/20; A61P 35/00
USPC ....................................................... 514/183
See application file for complete search history.

(56) References Cited

U.S. PATENT DOCUMENTS

| | | |
|---|---|---|
| 10,183,917 B2 | 1/2019 | Wang et al. |
| 10,562,910 B2 | 2/2020 | Wang et al. |
| 11,208,418 B2 | 12/2021 | Yang et al. |

OTHER PUBLICATIONS

Mar. 3, 2021 International Search Report issued in International Patent Application No. PCT/CN2020/132141.
Mar. 3, 2021 Written Opinion of the International Searching Authority issued in International Patent Application No. PCT/CN2020/132141.

*Primary Examiner* — Taylor V Oh
(74) *Attorney, Agent, or Firm* — Oliff PLC

(57) ABSTRACT

A crystalline form A of a nitrogen-containing tricyclic compound shown in formula (I), a pharmaceutical composition containing the crystalline form A, and the use of the crystalline form A or the pharmaceutical composition in the preparation of a medication for preventing, treating or relieving an FXR-mediated disease of a patient.

11 Claims, 7 Drawing Sheets

CRYSTALLINE FORM OF NITROGEN-CONTAINING TRICYCLIC COMPOUND AND USE THEREOF

This is a U.S. national stage application of the International Patent Application No. PCT/CN2020/132141, filed 27 Nov. 2020, which claims priority and benefits of the following application: CN 201911200268.9 having application date of Nov. 29, 2019, which is incorporated herein by reference in their entirety.

TECHNICAL FIELD

The invention belongs to the field of medicine, and relates to a crystal form of a nitrogen-containing tricyclic compound and use thereof, particularly relates to a crystal form of 2-((5-cyclopropyl-3-(2,6-dichlorophenyl)isoxazol-4-yl)methoxy)-10H-spiro[benzo[6,7]oxepino[3,2-b]pyridine-11,1'-cyclopropane]-7-carboxylic acid (compound having Formula (I)) and use thereof, and further relates to a pharmaceutical composition containing the crystal form. The crystal form or the pharmaceutical composition can be used for preventing, managing or lessening a disease mediated by FXR in a patient.

BACKGROUND

Farnesol X receptor (FXR) is a member of the nuclear hormone receptor superfamily, and is mainly expressed in the liver, kidneys and intestines (Seol et al. *Mol. Endocrinol* (1995), 9: 72-85; Forman, et al., Cell (1995), 81: 687-693). It functions as a heterodimer formed with the retinoid X receptor (RXR), and regulates gene transcription by binding to the response elements of the target gene promoter. The FXR-RXR heterodimer binds with highest affinity to an inverted repeat-1 (IR-1) response element, wherein consensus receptor-binding hexamers are separated by a nucleotide. FXR is activated by bile acids (the end product of cholesterol metabolism) (Makishima et al., Science (1999), 284: 1362-1365; Parks et al., Science (1999), 284:1365-1368; Wang et al., *Mol. Cell.* (1999), 3:543-553), and the bile acid is used to inhibit cholesterol catabolism. (Urizar et al., (2000) *J. Biol. Chem.* 275:39313-393170).

FXR is a critical regulator of cholesterol homeostasis, triglyceride synthesis and adipogenesis (Crawley, *Expert Opinion Ther. Patents* (2010), 20: 1047-1057). In addition as a target for treating dyslipidemia, obesity, vitamin D-related disease, intestinal disease, drug-induced side effects as well as hepatitis (Crawley, *Expert Opinion Ther. Patents* (2010), 20:1047-1057), FXR can also be as a therapeutic target for treating hepatobiliary disease, chronic hepatitis, non-alcoholic fatty liver disease (NAFLD), non-alcoholic steatohepatitis (NASH), cholestasis, liver fibrosis, liver cirrhosis, hepatitis B, metabolic disease, lipid metabolism disorder, carbohydrate metabolic disease, cardiovascular and metabolic diseases, atherosclerosis, type II diabetes and diabetic complication (Frank G. Schaap et al., *Journal of Medicinal Chemistry*, (2005), 48:5383-5402).

Patent applications WO 2018024224 and CN 107686486 have disclosed nitrogen-containing tricyclic compounds which can be used as FXR activity modulators, preparation methods and uses thereof. Wherein, compound 7, i.e., 2-((5-cyclopropyl-3-(2,6-dichlorophenyl)isoxazol-4-yl)methoxy)-10H-spiro[benzo[6,7]oxepino[3,2-b]pyridine-11,1'-cyclopropane]-7-carboxylic acid (compound having Formula (I)), has been specifically disclosed. However, the specific microstructure of the compound has not been disclosed in the patent applications, that is, any structure of crystal form of the compound has not been disclosed in the patent applications.

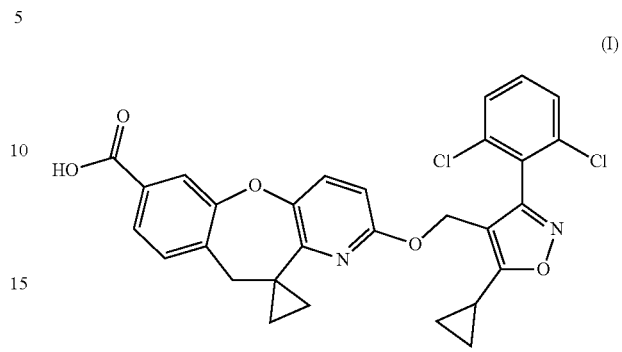

(I)

It's known in the art that drug polymorphism is a common phenomenon in drug development, and is an important factor affecting the quality of drugs. Different crystal forms of the same drug may have significant differences in appearance, solubility, melting point, dissolution, bioavailability, etc., and may have different effects on the stability, bioavailability and efficacy of the drug. Therefore, the drug should be fully considered the problem of polymorphism in drug research and development.

SUMMARY OF THE INVENTION

The invention provides a crystal form of 2-((5-cyclopropyl-3-(2,6-dichlorophenyl)isoxazol-4-yl)methoxy)-10H-spiro[benzo[6,7]oxepino[3,2-b]pyridine-11,1'-cyclopropane]-7-carboxylic acid (compound having Formula (I)), named crystal form A in the present invention. The invention provides a crystal form A of a compound having Formula (I) and pharmaceutical composition thereof, the crystal form A or pharmaceutical composition has better pharmacological properties (such as, good pharmacokinetic properties), and properties such as stability have been substantially improved, thereby it has excellent medicinal properties.

Specifically, the present invention relates to a crystal form A of a compound having Formula (I) and pharmaceutical composition thereof, and the use of the crystal form A and pharmaceutical composition in the manufacture of a medicament for preventing, treating or lessening a disease mediated by FXR in a patient. The crystal form A of the invention can be in the form of solvates, such as hydrates.

In one aspect, provided herein is a crystal form A of a compound having Formula (I),

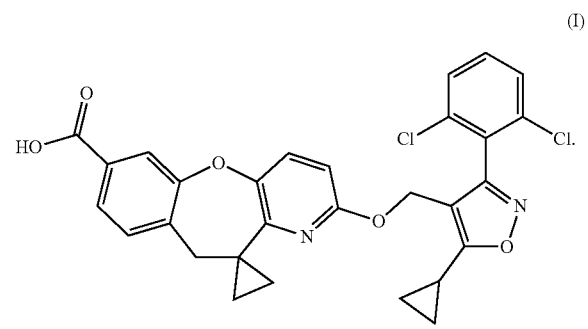 [SMILES: O=C(O)c1ccc2c(c1)Oc1ccc(OCc3c(-c4c(Cl)cccc4Cl)noc3C3CC3)nc1C1(CC1)C2]

(I)

In some embodiments, the crystal form A exhibits the following characteristic X-ray powder diffraction peaks expressed as 2θ at 14.07°±0.2°, 21.00°±0.2°, 22.59°±0.2°, 22.86°±0.20, 26.30°±0.20.

In some embodiments, the crystal form A exhibits the following characteristic X-ray powder diffraction peaks expressed as 2θ at 11.11°±0.2°, 14.07°±0.2°, 20.37°±0.2°, 21.00°±0.20, 22.59°±0.20, 22.86°±0.20, 23.32°±0.20, 24.85°±0.20, 25.57°±0.20, 26.11°±0.20, 26.30°±0.20, 28.92°±0.20, 38.74°±0.20.

In some embodiments, the crystal form A exhibits the following characteristic X-ray powder diffraction peaks expressed as 2θ at 7.22°±0.2°, 8.65°±0.2°, 11.11°±0.2°, 12.61°±0.2°, 12.92°±0.2°, 13.86°±0.20, 14.07°±0.2°, 14.37°±0.2°, 15.94°±0.2°, 16.68°±0.2°, 17.29°±0.2°, 18.95°±0.2°, 19.90°±0.2°, 20.37°±0.2°, 20.89°±0.2°, 21.00°±0.2°, 21.60°±0.2°, 22.24°±0.2°, 22.59°±0.2°, 22.86°±0.2°, 23.32°±0.2°, 24.28°±0.2°, 24.85°±0.2°, 25.29°±0.2°, 25.57°±0.2°, 26.11°±0.2°, 26.30°±0.2°, 26.77°±0.2°, 27.62°±0.2°, 27.94°±0.2°, 28.15°±0.2°, 28.92°±0.2°, 30.61°±0.2°, 31.13°±0.2°, 31.41°±0.2°, 32.14°±0.2°, 33.65°±0.2°, 34.39°±0.2°, 34.73°±0.2°, 35.54°±0.2°, 36.38°±0.2°, 36.80°±0.2°, 37.76°±0.2°, 38.24°±0.2°, 38.74°±0.2°, 39.48°±0.2°, 40.08°±0.2°, 40.59°±0.2°, 42.34°±0.2°, 43.30°±0.2°, 43.99°±0.2°, 44.53°±0.2°, 45.29°±0.2°, 46.10°±0.2°, 47.83°±0.2°, 48.64°±0.2°, 49.91°±0.2°, 51.75°±0.2°, 54.43°±0.2°, 58.46°±0.2°.

In some embodiments, the crystal form A has an X-ray powder diffraction pattern substantially as shown in FIG. 1.

In some embodiments, the crystal form A has a differential scanning calorimetry thermogram comprising an endothermic peak at 196.35° C.±3° C.

In some embodiments, the crystal form A has a differential scanning calorimetry thermogram substantially as shown in FIG. 2.

In some embodiments, when the crystal form A is heated to 150° C., its thermogravimetric analysis curve contains a weight loss of 0.121%.

In some embodiments, the crystal form A has a thermogravimetric analysis curve substantially as shown in FIG. 3.

In one aspect, provided herein is a pharmaceutical composition comprising the crystal form A of the invention or a combination thereof, and a pharmaceutically acceptable carrier, excipient, diluent, adjuvant or a combination thereof.

In another aspect, the invention also relates to the use of the crystal form A of the compound having Formula (I) or the pharmaceutical composition in manufacture of a medicament for preventing, treating or lessening a disease mediated by FXR in a patient; further, the use includes administering to the human or animal a therapeutically effective amount of the crystal form A or the pharmaceutical composition of the invention.

In some embodiments, the disease mediated by FXR is cardiovascular and cerebrovascular disease, a disease related to dyslipidemia, metabolic syndrome, hyperproliferative disease, fibrosis, inflammatory disease or a disease related to liver and gallbladder.

In other embodiments, the cardiovascular and cerebrovascular disease is atherosclerosis, acute myocardial infarction, venous occlusive disease, portal hypertension, pulmonary hypertension, heart failure, peripheral arterial occlusive disease, sexual dysfunction, stroke or thrombosis.

In other embodiments, the metabolic syndrome is insulin resistance, hyperglycemia, hyperinsulinemia, elevated levels of fatty acid or triglyceride in the blood, hyperlipidemia, obesity, hypertriglyceridemia, hypercholesterolemia, syndrome X, diabetic complications, atherosclerosis, hypertension, acute anemia, neutropenia, dyslipidemia, type II diabetes, diabetic nephropathy, diabetic neuropathy, diabetic retinopathy, dyslipidemia, or comorbidities of diabetes and abnormally high body mass index.

In other embodiments, the hyperproliferative disease is hepatocellular carcinoma, colonic adenocarcinoma, polyposis, colonic adenocarcinoma, breast cancer, membrane adenocarcinoma, Barrett's esophagus cancer, or other forms of gastrointestinal or liver neoplastic diseases.

In other embodiments, the fibrosis, inflammatory disease or disease related to liver and gallbladder is non-alcoholic fatty liver, non-alcoholic steatohepatitis, cholestasis, liver fibrosis, primary biliary cirrhosis, primary sclerosing cholangitis, progressive familial intrahepatic cholestasis, cystic fibrosis, drug-induced bile duct damage, gallstones, liver cirrhosis, hepatitis B, sebaceous gland disease, alcohol-induced liver cirrhosis, bile duct obstruction, gallstone disease, colitis, neonatal jaundice, nuclear jaundice, or overgrowth of intestinal bacteria.

In one aspect, the invention relates to a method of preventing, treating or lessening a disease mediated by FXR in a patient, comprising administering to the patient a pharmaceutically acceptable effective amount of the crystal form A or the pharmaceutical composition of the invention.

In another aspect, the invention relates to the crystal form A of the compound having Formula (I) or the pharmaceutical composition for use in preventing, treating or lessening a disease mediated by FXR in a patient.

In another aspect, the present invention also relates to the preparation method of the crystal form A of the compound having Formula (I).

The solvent used in the production method of the crystal form A in the invention is not particularly restricted, and any solvent which dissolves the starting material to a degree and does not affect its properties is contained in the present invention. Additionally, many similar modifications in the art, equivalent replacements, or solvent, solvent composition and the solvent composition with different proportions which are equivalent to those described in the invention, are all deemed to be included in the present invention. The present invention gives the preferred solvent for each reaction step.

The preparation of the crystal form A of the present invention will be described in detail in the examples section. Meanwhile, the present invention provides property test experiments of the crystal form A, such as pharmacokinetic experiment, stability test, and hygroscopicity test, and the like. From the experimental results, it can be seen that the crystal form A of the compound having Formula (I) of the invention has better biological activity and high stability, and is suitable for pharmaceutical use. Specifically, the crystal form A of the present invention has more excellent pharmacokinetic properties, such as a higher exposure level.

The description of the hygroscopic feature and the definition of the hygroscopic weight gain (Chinese Pharmacopoeia 2015 edition, Appendix 9103 Guidelines for Drug Hygroscopicity Tests, experimental conditions: 25° C.±1° C., 80%±2% relative humidity) are as described in the table below.

The description of the hygroscopic feature and the definition of the hygroscopic weight gain

| The hygroscopic feature | The hygroscopic weight gain |
| --- | --- |
| Deliquescence | Absorb enough water to form a liquid |
| Highly hygroscopicity | Not less than 15% |

| The hygroscopic feature | The hygroscopic weight gain |
|---|---|
| Hygroscopicity | Less than 15% but not less than 0.2% |
| Lightly hygroscopicity | Less than 2% but not less than 0.2% |
| No or almost none hygroscopicity | Less than 0.2% |

The crystal form A of the invention is not susceptible to deliquescence due to high humidity, and it is convenient for the long-term storage of the medicine.

Definitions and General Terminology

Unless otherwise indicated, all technical and scientific terms used in the present invention have the same meaning as commonly understood by one of ordinary skill in the art to which this invention pertains. All patents and publications referred to herein are incorporated by reference in their entirety. Although any methods and materials similar or identical to those described herein may be used in the practice or testing of the invention, but the methods, apparatus and materials described in the invention are preferred.

"Crystal form" or "crystalline form" refers to a solid having a highly regular chemical structure, including, but not limited to, mono- or multi-component crystals, and/or polymorphic compounds of compounds, solvates, hydrates, clathrates, eutectic, salt, solvate of salt, hydrate of salt. The crystalline form of the material can be obtained by a number of methods known in the field. Such methods include, but are not limited to, melt crystallization, melt cooling, solvent crystallization, crystallization in defined space, for example, in nanopores or capillaries, on a surface or template, for example, on a polymer, in the presence of additives such as co-crystallization counterions, removing solvent, dehydration, rapid evaporation, rapid cooling, slow cooling, vapor diffusion, sublimation, reaction crystallization, anti-solvent addition, grinding and solvent drop milling, etc.

"Solvent" refers to a substance (typically a liquid) that is capable of completely or partially dissolving another substance (typically a solid). Solvents for use in the practice of this invention include, but are not limited to, water, acetic acid, acetone, acetonitrile, benzene, chloroform, carbon tetrachloride, dichloromethane, dimethylsulfoxide, 1,4-dioxane, ethanol, ethyl acetate, butanol, t-butanol, N,N-dimethylacetamide, N,N-dimethylformamide, formamide, formic acid, heptane, hexane, isopropanol, methanol, methyl ethyl ketone, mesitylene, nitromethane, polyethylene glycol, propanol, pyridine, tetrahydrofuran, toluene, xylene, mixtures thereof, and the like.

"Anti-solvent" refers to a fluid that promotes the precipitation of a product (or product precursor) from a solvent. The anti-solvent may comprise a cold gas, or a fluid that promotes the precipitation of the product by chemical reaction or reduces the solubility of the product in the solvent; it may be the same liquid as the solvent but at a different temperature, or it may be a liquid different from the solvent.

"Solvate" refers to a compound that having a solvent on a surface, in a lattice, or having a solvent on a surface and in a lattice. The solvent can be water, acetic acid, acetone, acetonitrile, benzene, chloroform, carbon tetrachloride, dichloromethane, dimethylsulfoxide, 1,4-dioxane, ethanol, ethyl acetate, butanol, t-butanol, N,N-dimethylacetamide, N,N-dimethylformamide, formamide, formic acid, heptane, hexane, isopropanol, methanol, methyl ethyl ketone, methyl pyrrolidone, mesitylene, nitromethane, polyethylene glycol, propanol, pyridine, tetrahydrofuran, toluene, xylene, mixtures thereof, and the like. A specific example of the solvate is a hydrate in which the solvent on the surface, in the lattice or on the surface and in the lattice is water. On the surface, in the lattice or on the surface and in the lattice of the substance, the hydrate may or may not have any solvent other than water.

Crystal form can be identified by a variety of technical means, such as X-ray powder diffraction (XRPD), infrared absorption spectroscopy (IR), melting point method, differential scanning calorimetry (DSC), thermogravimetric analysis (TGA), Nuclear magnetic resonance, Raman spectroscopy, X-ray single crystal diffraction, dissolution calorimetry, scanning electron microscopy (SEM), quantitative analysis, solubility and dissolution rate.

X-ray powder diffraction (XRPD) can detect changes in crystal form, crystallinity, crystal state and other information, and is a common means for identifying crystal form. In some embodiments, the crystalline form A of the present invention is characterized by an XRPD pattern having certain peak positions, which is substantially as shown in the XRPD pattern provided in the drawings of the present invention. At the same time, the 2θ of the XRPD pattern can be measured with an experimental error. The measurement of 2θ of the XRPD pattern may be slightly different between the different instruments and the different samples. Therefore, the value of 2θ can not be regarded as absolute. According to the condition of the instrument used in this test, the diffraction peak has an error tolerance of ±0.20.

Differential Scanning Calorimetry (DSC) is a technique of measuring the change of energy difference between a sample and an inert reference (commonly used $\alpha\text{-}Al_2O_3$) varied with temperature by continuously heating or cooling under program control. In some embodiments, the crystal form of the present invention is characterized by an DCS thermogram having certain peak positions, which is substantially as shown in the DCS thermogram provided in the drawings of the present invention. At the same time, the DCS thermogram may have experimental errors. The peak position and peak value of DCS thermogram may be slightly different between the different instruments and the different samples. Therefore, the peak position or the peak value of the DSC endothermic peak can not be regarded as absolute. According to the condition of the instrument used in this test, the endothermic peak has an error tolerance of ±3°.

Thermogravimetric analysis (TGA) is a technique for measuring the change in the mass of a substance varied with temperature under the control of a program. It is suitable for examining the process of the solvent loss or the samples sublimation and decomposition. It can be presumed that the crystal contains crystal water or crystallization solvent. The change of the mass shown on the TGA curve depends on a number of factors, such as the sample preparation and the instrument. The change of the mass from the TGA test varies slightly between the different instruments and between the different samples. According to the condition of the instrument used in this test, there is a ±0.1% error tolerance for the mass change.

In the context of the present invention, the 2θ values in the X-ray powder diffraction pattern are in degrees (°).

The term "substantially as shown in the FIG." refers to at least 50%, or at least 60%, or at least 70%, or at least 80%, or at least 90%, or at least 95%, or at least 99% of the peaks are shown in the X-ray powder diffraction pattern or DSC pattern.

The "peak" refers to a feature that a person skilled in the art can recognize without belonging to background noise when referring to a spectrum or/and data that appears in the figure.

The invention relates to a novel crystal form A of 2-((5-cyclopropyl-3-(2,6-dichlorophenyl)isoxazol-4-yl)methoxy)-10H-spiro[benzo[6,7]oxepino[3,2-b]pyridine-11, 1'-cyclopropane]-7-carboxylic acid (compound having Formula (I)), which exists in a substantially pure crystal form.

"Substantially pure" means that a crystalline form is substantially free of another or more crystalline forms, that means the purity of the crystalline form is at least 80%, or at least 85%, or at least 90%, or at least 93%, or at least 95%, or at least 98%, or at least 99%, or at least 99.5%, or at least 99.6%, or at least 99.7%, or at least 99.8%, or at least 99.9%, or crystal form containing other crystal form. The percentage of the other crystal form in the total volume or total weight of the crystal form is less than 20%, or less than 10%, or less than 5%, or less than 3%, or less than 1%, or less than 0.5%, or less than 0.1%, or less than 0.01%.

"Substantially free" means that the percentage of one or more other crystalline forms in the total volume or total weight of the crystalline form is less than 20%, or less than 10%, or less than 5%, or less than 4%, or less than 3%, or less than 2%, or less than 1%, or less than 0.5%, or less than 0.1%, or less than 0.01%.

"Relative strength" or "relative peak height" in XRPD pattern means the ratio of the intensity of the other peaks to the intensity of the first strong peak when the intensity of the first strong peak in all the diffraction peaks of the X-ray powder diffraction pattern (XRD) is 100%.

In the context of the present invention, when used or whether or not used the word, such as "about", it means that within a given value or range of 10% or less, appropriately within 5%, especially within 1%. Or, for those of ordinary skill in the art, the term "about" means within an acceptable standard error range of the mean value. When a number with an N value is made public, any number within N+/−1%, N+/−2%, N+/−3%, N+/−5%, N+/−7%, N+/−8%, or N+/−10% will be opened clearly, wherein "+/−" means plus or minus.

In the present invention, "room temperature" refers to the temperature from about 10° C. to about 40° C. In some embodiments, "room temperature" refers to a temperature from about 20° C. to about 30° C.; in other embodiments, "room temperature" refers to 20° C., 22.5° C., 25° C., 27.5° C., and the like.

Pharmaceutical Compositions, Formulations, Administration and Uses of the Crystal Form A of the Present Invention The pharmaceutical composition of the present invention is characterized by comprising the crystal form A of the compound having Formula (I), and a pharmaceutically acceptable carrier, adjuvant, or excipient. The amount of the crystal form A of the compound in the pharmaceutical composition of the present invention can be effectively and detectably for treating or lessening the disease mediated by FXR in a patient.

As described above, the pharmaceutical composition disclosed herein further comprises a pharmaceutically acceptable carrier, an adjuvant, or an excipient, which, as used herein, includes any and all solvents, diluents, or other liquid vehicles, dispersion or suspension aids, surface active agents, isotonic agents, thickening or emulsifying agents, preservatives, solid binders, lubricants, and the like, as suited to the particular dosage form desired. As described in the following: *In Remington: The Science and Practice of Pharmacy,* 21st edition, 2005, ed. D. B. Troy, Lippincott Williams& Wilkins, Philadelphia, and *Encyclopedia of Pharmaceutical Technology*, eds. J. Swarbrick and J. C. Boylan, 1988-1999, Marcel Dekker, New York, both of which are herein incorporated by reference in their entireties, discloses various carriers used in formulating pharmaceutically acceptable compositions and known techniques for the preparation thereof. Except insofar as any conventional carrier medium incompatible with the compound or the crystal form disclosed herein, such as by producing any undesirable biological effect or otherwise interacting in a deleterious manner with any other components of the pharmaceutically acceptable composition, its use is contemplated to be within the scope of this invention.

The crystal form A of the present invention can be used as an active ingredient and uniformly combined in a mixture with a drug carrier according to conventional drug compounding technology. The carrier can be in various forms according to the formulation required for administration, such as oral or parenteral (including intravenous). When preparing a composition for oral dosage form, any conventional pharmaceutical medium can be used, for example, water, glycol, oil, alcohol, fragrance, preservative, colorant, etc., can be used when preparing oral liquid medicaments such as suspensions, elixirs and solutions; or, for example, starch, sugar, microcrystalline cellulose, diluents, granulating agents, lubricants, binders, disintegrants, etc., can be used in the preparation of oral solid preparations such as powders, hard capsules, soft capsules and tablets, among which solid oral preparations are more preferable than liquid pharmaceuticals.

Because tablets and capsules are easy to take, they represent the most advantageous oral dosage unit form, in this case solid pharmaceutical carriers are obviously used. If necessary, tablets can be coated with standard aqueous or non-aqueous techniques. Such compositions and preparations should contain at least 0.1% of active ingredients. Of course, the percentage of active ingredients in these compositions can be varied, and the percentage can conveniently vary from about 2% to about 60% of the unit weight. The active ingredient can be administered intranasally in the form of, for example, droplets or spray.

The tablets, pills, capsules, etc. may also contain: binders (such as tragacanth, gum arabic, corn starch or gelatin); excipients (such as dicalcium phosphate); disintegrants (such as corn starch, potato starch, alginic acid); lubricants (such as magnesium stearate); and sweeteners (such as sucrose, lactose or saccharin). When the dosage unit form is a capsule, it may contain a liquid carrier (such as fatty oil) in addition to the aforementioned types of materials.

A variety of other materials can be present as coatings or to modify the shape of the dosage unit. For example, tablets can be coated with shellac, sugar, or both. In addition to the active ingredients, syrups or elixirs may contain sucrose as a sweetener, methyl or propyl 4-hydroxybenzoate as preservatives, dyes and flavoring agents (for example, cherry flavored or orange flavored).

Ophthalmic formulations, eye ointments, powders, solutions and the like, are also contemplated as being within the scope of this invention.

The crystal form A of the present invention can also be administered parenterally. A solution or suspension of these active substances can be prepared by mixing appropriately with a surfactant (such as hydroxypropyl cellulose) in water. In glycerin, liquid polyethylene glycol and mixtures thereof, and in oil, dispersants can also be prepared. Under normal conditions of storage and use, these preparations contain a preservative to prevent the growth of microorganisms.

Pharmaceutical forms suitable for injection include sterile aqueous solutions or dispersions and sterile powders for the immediate preparation of sterile injectable solutions or dispersions. In all cases, the pharmaceutical form must be sterile and must be a fluid in an easily injectable form. It must be stable under the conditions of manufacture and storage and must be preserved under conditions that resist the contaminating action of microorganisms such as bacteria and fungi. The carrier can be a solvent or dispersion medium containing, for example, water, ethanol, polyol (e.g. glycerol, propylene glycol and liquid polyethylene glycol), suitable mixtures thereof, and vegetable oils.

Any suitable method of administration can be used to provide an effective dose of the crystal form of the present invention to mammals, especially humans. For example, oral, rectal, topical, parenteral, intraocular, pulmonary, and nasal administration methods can be used. Dosage forms include tablets, lozenges, dispersions, suspensions, solutions, capsules, emulsions, ointments, aerosols, and the like.

The therapeutically effective dosage of the crystal form A, the pharmaceutical composition, or the combinations thereof, is dependent on the species of the subject, the body weight, age and individual condition, the disorder or disease or the severity thereof being treated. A physician, clinician or veterinarian of ordinary skill can readily determine the effective amount of each of the active ingredients necessary to prevent, treat or inhibit the progress of the disorder or disease.

When using the compound of the present invention or its crystal form A to treat or prevent the disease mediated by FXR described in the present invention, the compound of the present invention or its crystal form A is administered at a daily dose of about 0.1 mg to about 100 mg per kilogram of animal body weight, preferably a single daily dose, or in divided doses of 2 to 6 times a day, or by continuous release, has obtained a generally satisfactory result. For most large mammals, the total daily dose is about 1.0 mg to about 1000 mg, preferably about 1 mg to about 50 mg. For a 70 kg adult, the total daily dose is generally 7 mg to about 350 mg. This dosage method can be adjusted to provide the best therapeutic effect.

The crystal form A of the present invention or pharmaceutical composition thereof can be effectively used for preventing, managing, treating, or lessening the disease mediated by FXR in patients, especially effectively used for treating non-alcoholic fatty liver (NAFLD) and non-alcoholic steatohepatitis (NASH), obesity, hypertriglyceridemia, atherosclerosis, chronic intrahepatic cholestasis, primary biliary cirrhosis (PBC), primary sclerosing cholangitis (PSC), progressive Familial cholestasis (PFIC), drug-induced bile duct damage, gallstones, liver cirrhosis, hepatitis B, sebaceous gland disease, alcohol-induced liver cirrhosis, cystic fibrosis, bile duct obstruction, gallstone disease, liver fibrosis, dyslipidemia, atherosclerosis, type II diabetes, diabetic nephropathy, diabetic neuropathy, diabetic retinopathy, peripheral arterial obstructive disease (PAOD), colitis, neonatal Jaundice, nuclear jaundice, venous occlusive disease, portal hypertension, metabolic syndrome, acute myocardial infarction, acute stroke, thrombosis, hypercholesterolemia, intestinal bacterial overgrowth, erectile dysfunction, gastrointestinal tumor and liver tumor, etc.

EMBODIMENTS

The invention will now be further described by way of examples without limiting the invention to the scope of the examples.

The X-ray powder diffraction analysis method used in the present invention was an Empyrean diffractometer, and an X-ray powder diffraction pattern was obtained using Cu-Kα radiation (45 KV, 40 mA). The powdery sample was prepared as a thin layer on a monocrystalline silicon sample rack and placed on a rotating sample stage, analyzed at a rate of 0.0167 steps in the range of 3°-60°. Data Collector software was used to collect data, HighScore Plus software was used to process data, and Data Viewer software was used to read data.

The differential scanning calorimetry (DSC) analysis method used in the present invention was performing a differential scanning calorimetry analysis using a TA Q2000 module with a thermal analysis controller. Data were collected and analyzed using TA Instruments Thermal Solutions software. Approximately 1-5 mg of the sample was accurately weighed into a specially crafted aluminum crucible with a lid and analyzed from room temperature to about 300° C. using a linear heating device at 10° C./min. During use, the DSC chamber was purged with dry nitrogen.

The thermogravimetric analysis (TGA) analysis method used in the present invention is performing a thermogravimetric analysis using a TA Q500 module with a thermal analysis controller. Data were collected and analyzed using TA Instruments Thermal Solutions software. Approximately 10-30 mg of the sample was placed into a platinum crucible and analyzed from room temperature to about 300° C. using a linear heating device at 10° C./min. During use, the DSC chamber was purged with dry nitrogen.

Specific Embodiments

The specific synthetic method of compound having Formula (I) named 2-((5-cyclopropyl-3-(2,6-dichlorophenyl)

isoxazol-4-yl)methoxy)-10H-spiro[benzo[6,7]oxepino[3,2-b]pyridine-11,1'-cyclopropane]-7-carboxylic acid refers to example 9 in patent application CN 107686486.

EXAMPLES

Example 1 a Crystal Form A of the Compound Having Formula (I)

1. Preparation of Crystal Form A

Compound 2-((5-cyclopropyl-3-(2,6-dichlorophenyl)isoxazol-4-yl)methoxy)-10H-spiro [benzo[6,7]oxepino[3,2-b]pyridine-11,1'-cyclopropane]-7-carboxylic acid (201.5 mg) was added into isopropanol (4.0 mL) at room temperature, then the mixture was refluxed with stirring to dissolve the material, then heating was stopped. The mixture was naturally cooled to room temperature and stirred for crystallization for 12 hours. The resulting mixture was filtered by suction, and the filter cake was dried over in vacuo at 50° C. overnight to give a white solid (120.3 mg, 59.7%).

Figure 1:
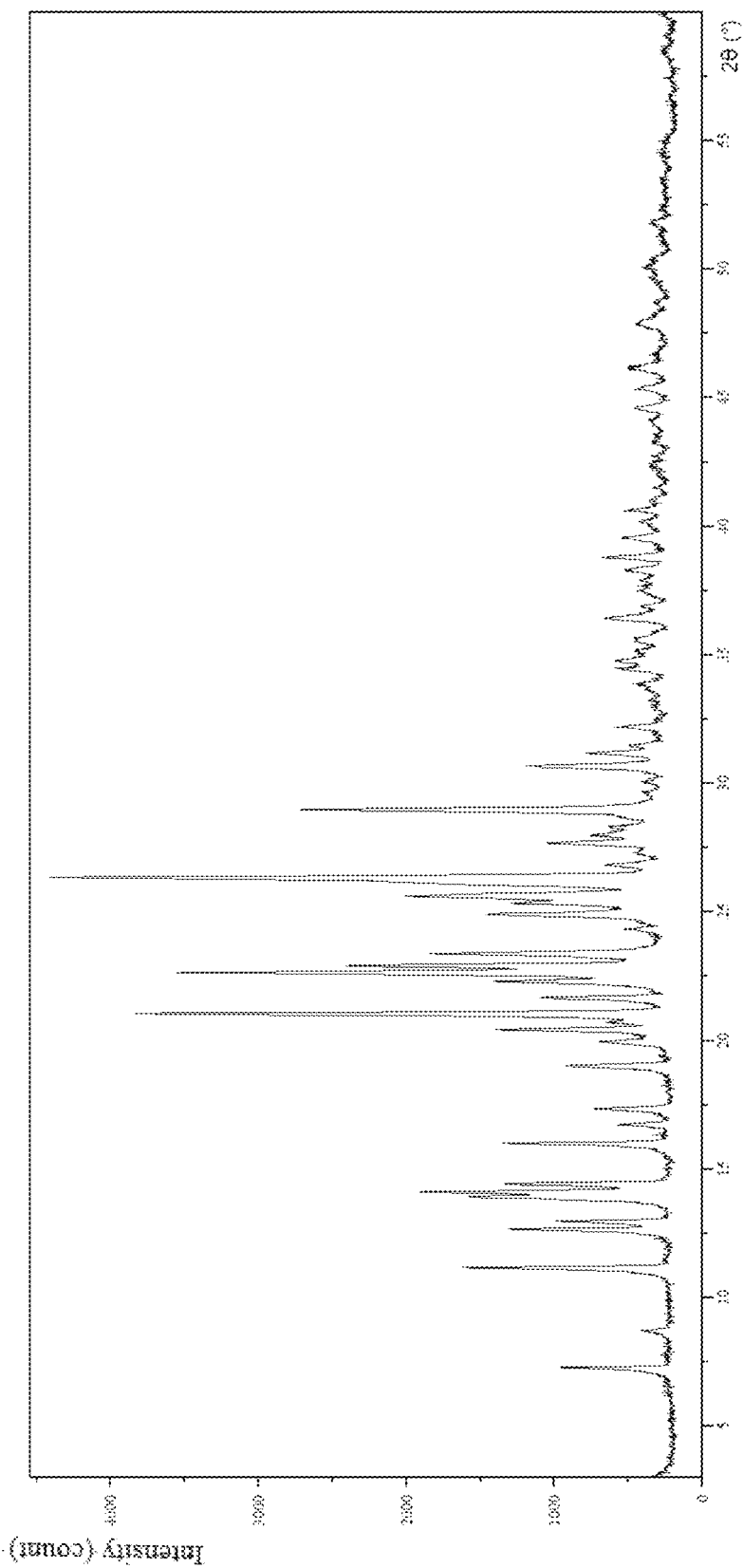
FIG. 1 is an X-ray powder diffraction (XRPD) pattern of the crystal form A of the compound having Formula (I) prepared according to the method of Example 1 of the present invention.

2. Identify of Crystal Form A (1) The crystal form A was identified by Empyrean X-ray powder diffraction (XRPD) analysis using Cu-Kα radiation, and the crystal form A exhibited the following characteristic peaks at angles of 2θ: 7.22°, 8.65°, 11.110, 12.610, 12.92°, 13.86°, 14.07°, 14.37°, 15.94°, 16.68°, 17.29°, 18.95°, 19.90°, 20.37°, 20.89°, 21.00°, 21.60°, 22.24°, 22.59°, 22.86°, 23.32°, 24.28°, 24.85°, 25.29°, 25.57°, 26.11°, 26.30°, 26.77°, 27.62°, 27.94°, 28.15°, 28.92°, 30.61°, 31.13°, 31.41°, 32.14°, 33.65°, 34.39°, 34.73°, 35.54°, 36.38°, 36.80°, 37.76°, 38.24°, 38.74°, 39.48°, 40.08°, 40.59°, 42.34°, 43.30°, 43.99°, 44.53°, 45.29°, 46.10°, 47.83°, 48.64°, 49.91°, 51.75°, 54.430 and 58.46°, there was an error tolerance of ±0.2°. The X-ray powder diffraction of the crystal form A prepared by the method of the example was substantially as shown in FIG. 1.

Figure 2:
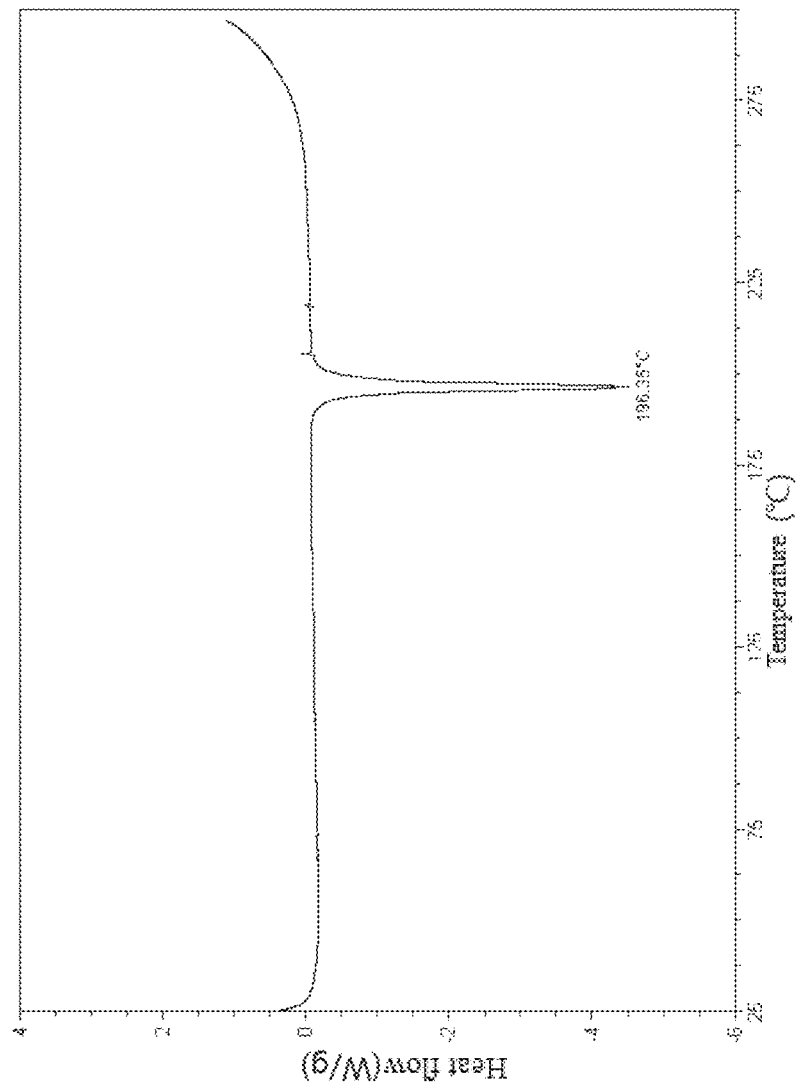
FIG. 2 is a differential scanning calorimetry (DSC) thermogram of the crystal form A of the compound having Formula (I) prepared according to the method of Example 1 of the present invention.

(2) The crystal form A was analyzed and identified by TA Q2000 Differential Scanning Calorimetry (DSC): the scanning speed was 10° C./min, and the crystal form A had an endothermic peak of 196.35° C., and there was an error tolerance of ±3° C. The differential scanning calorimetry thermogram of the crystal form A prepared by the method of the example was substantially as shown in FIG. 2.

Figure 3:
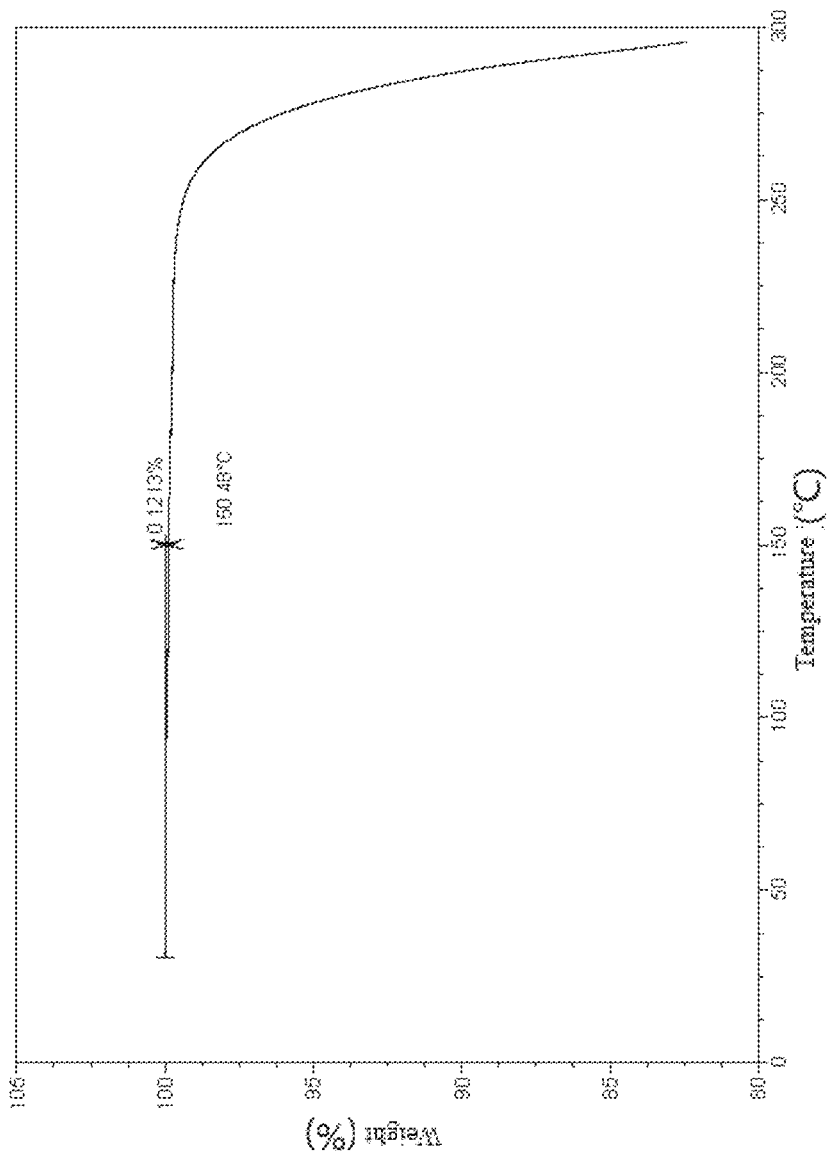
FIG. 3 is a thermogravimetric analysis (TGA) thermogram of the crystal form A of the compound having Formula (I) prepared according to the method of Example 1 of the present invention.

(3) The crystal form A was analyzed and identified by Thermogravimetric Analysis (TGA) using TA Q500: the heating rate was 10° C./min, the weight loss was 0.121%, and there was an error tolerance of ±0.1%. The thermogravimetric Analysis graph of the crystal form A prepared by the method of the example was substantially as shown in FIG. 3.

Example 2 the Pharmacokinetic Test of the Crystal Form A of the Present Invention The crystal form A of compound having Formula (I) named 2-((5-cyclopropyl-3-(2,6-dichlorophenyl)isoxazol-4-yl)methoxy)-10H-spiro[benzo[6,7]oxepino[3,2-b]pyridine-11,1'-cyclopropane]-7-carboxylic acid was filled into capsules, which was for oral administration.

8-12 kg Male Beagle dogs were given 5 mg/kg test sample orally, with 3 animals in each group. Blood samples were taken at time points of 0.25, 0.5, 1.0, 2.0, 4.0, 6.0, 8.0, 12 and 24 h. Standard curve was plotted based on concentrations of the samples in a suitable range, the concentration of the test sample in the plasma sample was measured and quantified by AB SCIEX API4000 LC-MS/MS at MRM mode. Pharmacokinetic parameters were calculated according to drug concentration-time curve using a noncompartmental model by WinNonLin 6.3 software. Results were as shown in Table 1.

TABLE 1

Pharmacokinetic data of the crystal form A of the present invention

| Test sample | dosage (mg/kg) | $AUC_{last}$ (h*ng/ml) | $C_{max}$ (ng/ml) | $T_{max}$ (h) |
|---|---|---|---|---|
| Crystal form A | 5 | 237 | 86 | 0.667 |

Conclusion

It can be seen from Table 1 that the crystal form A of the present invention has a relatively large exposure in Beagle dogs and has good pharmacokinetic properties.

Figure 4:
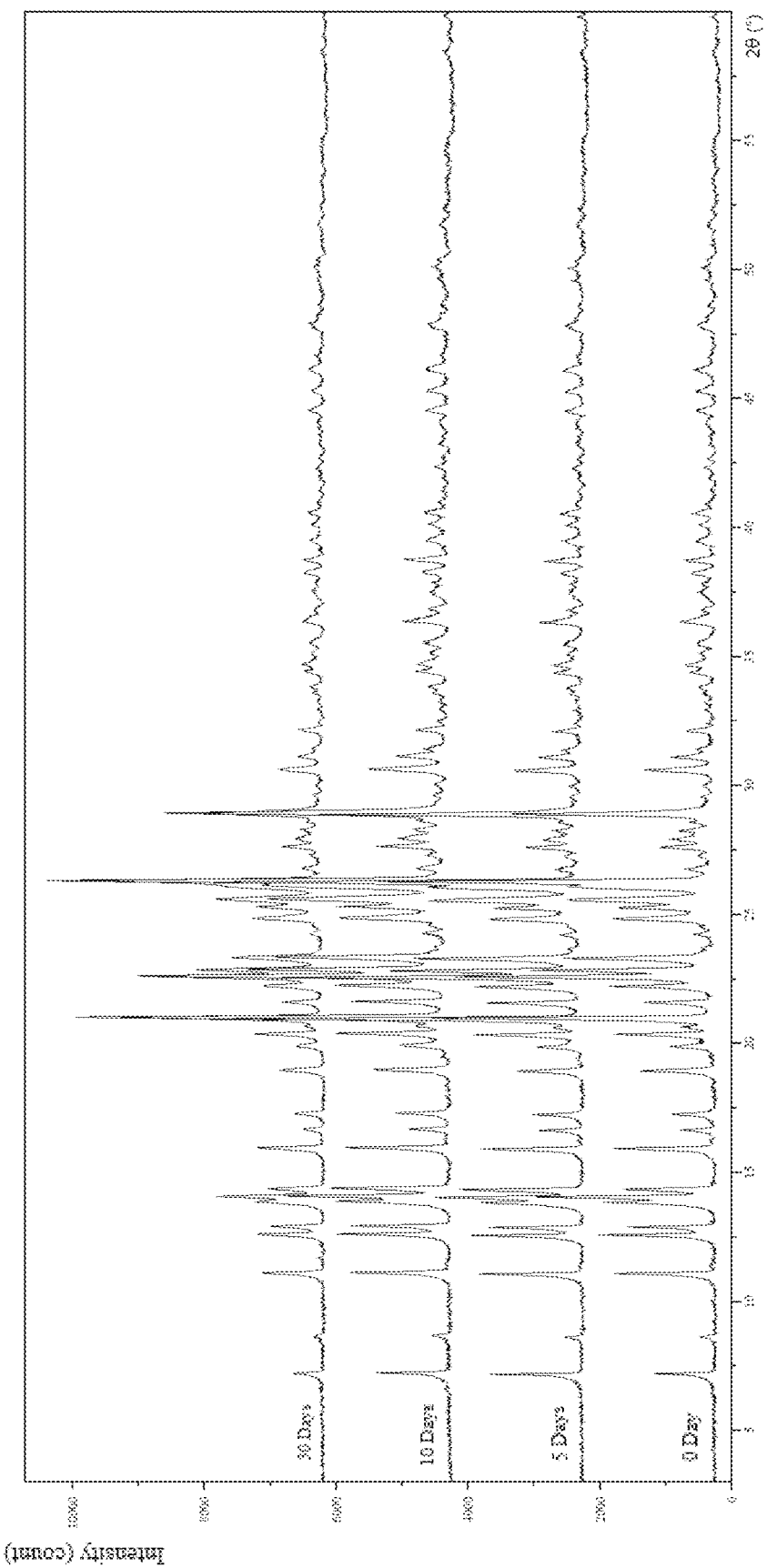
FIG. 4 shows the changes of X-ray powder diffraction pattern of the crystal form A of the compound having Formula (I) during the stability experiment under high temperature condition according to the method (1) of Example 3 of the present invention.

Example 3 the Stability Test of the Crystal Form A of the Present Invention (1) High-temperature test: A batch of the test sample was taken into a flat weighing bottle, divided into ≤5 mm thick thin layer. The sample was placed at 60° C. for 30 days. The sample was then sampled at day 5, day 10 and day 30, and the change of the sample's color was observed. The purity of the sample was detected by HPLC, and the structure of the sample was analyzed by X-ray powder diffraction, the change of X-ray powder diffraction in high temperature test was substantial as shown in FIG. 4.

Figure 5:
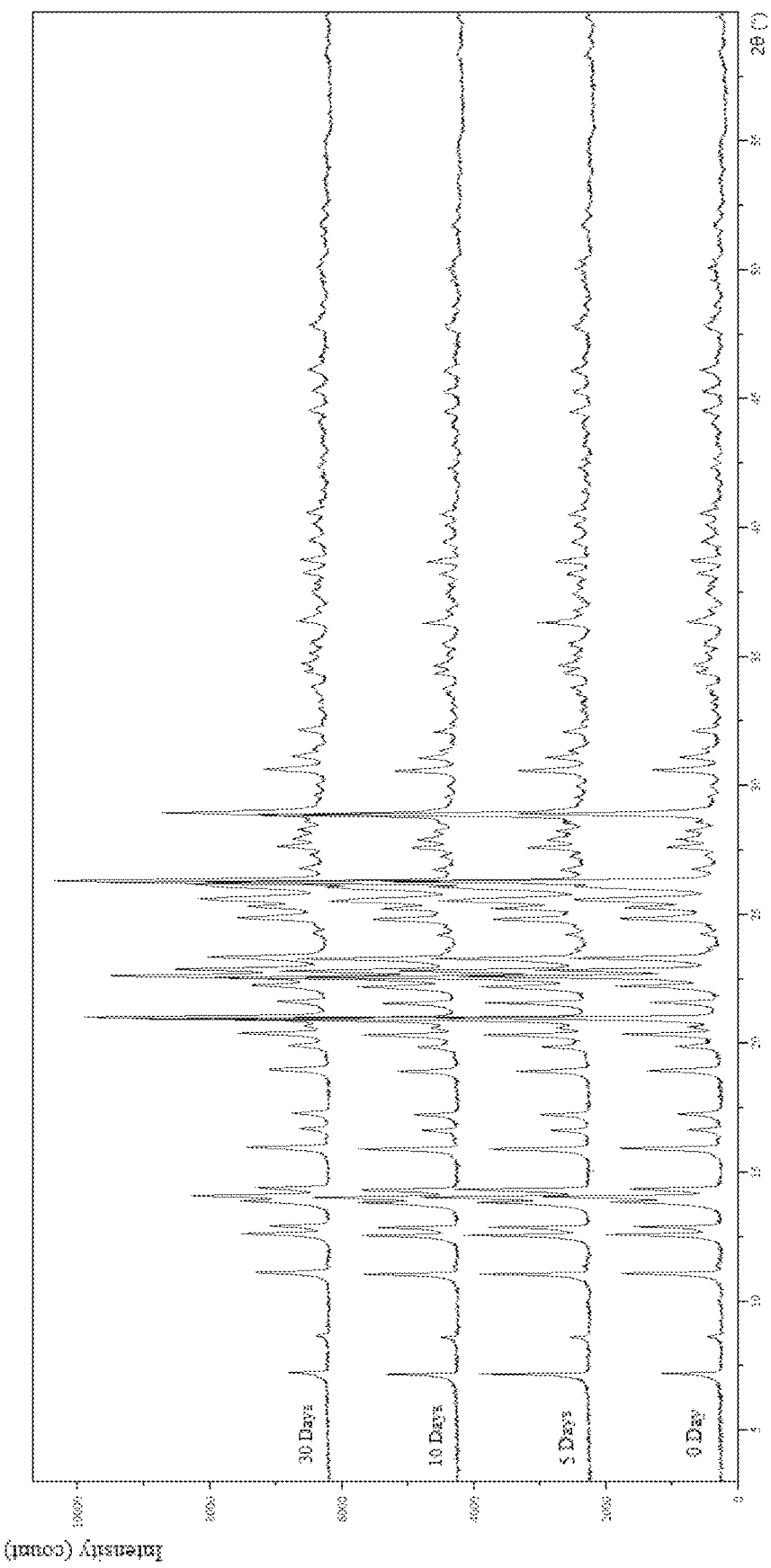
FIG. 5 shows the changes of X-ray powder diffraction pattern of the crystal form A of the compound having Formula (I) during the stability experiment under high humidity condition according to the method (2) of Example 3 of the present invention.

(2) High-humidity test: A batch of the test sample was taken into a flat weighing bottle, divided into ≤5 mm thick thin layer. The sample was placed at 25° C., RH 90%±5% for 30 days. The sample was then sampled at day 5, day 10 and day 30, and the change of the sample's color was observed. The purity of the sample was detected by HPLC, and the structure of the sample was analyzed by X-ray powder diffraction, the change of X-ray powder diffraction in high humidity test was substantial as shown in FIG. 5.

Figure 6:
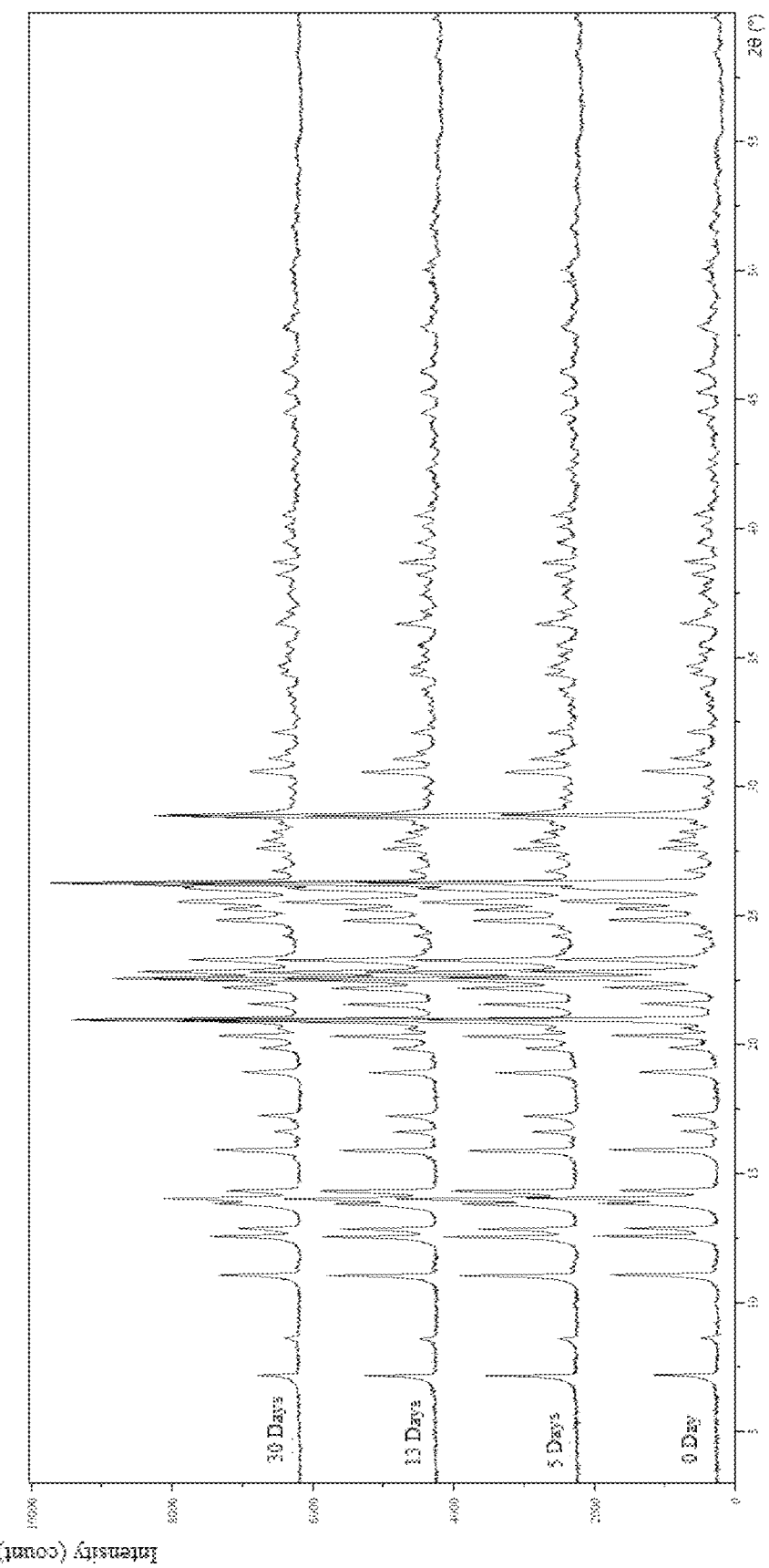
FIG. 6 shows the changes of X-ray powder diffraction pattern of the crystal form A of the compound having Formula (I) during the stability experiment under light condition according to the method (3) of Example 3 of the present invention.

(3) Light test: A batch of the test sample was taken into a flat weighing bottle, divided into ≤5 mm thick thin layer. The sample was placed in an opened light box (with UV) at the illuminance 4500±500lx, UV light ≥0.7 w/m² for 30 days. The sample was then sampled at day 5, day 13 and day 30, and the change of the sample's color was observed. The purity of the sample was detected by HPLC, and the structure of the sample was analyzed by X-ray powder diffraction, the change of X-ray powder diffraction in light test was substantial as shown in FIG. 6.

The changes of appearance and chemical purity of the test samples in the stability test were as shown in Table 2.

TABLE 2

| | The stability test of the crystal form A of the present invention | | | | | | | | |
|---|---|---|---|---|---|---|---|---|---|
| Condition | | High-temperature | | | High-humidity | | | Light | |
| Project | 0 days | 5 days | 10 days | 30 days | 5 days | 10 days | 30 days | 5 days | 13 days | 30 days |
| Appearance | White powder | White powder | White powder | White powder | White powder | White powder | White powder | White powder | White powder | White powder |
| Purity (%) | 99.44 | 99.33 | 99.35 | 99.45 | 99.55 | 99.39 | 99.42 | 99.53 | 99.31 | 99.43 |

Conclusion

Under the conditions of high-temperature, high-humidity and light, the appearance, chemical purity and crystal form of the crystal form A of the present invention have no obvious changes, the stability effect is good, and it is suitable for pharmaceutical use.

Figure 7:
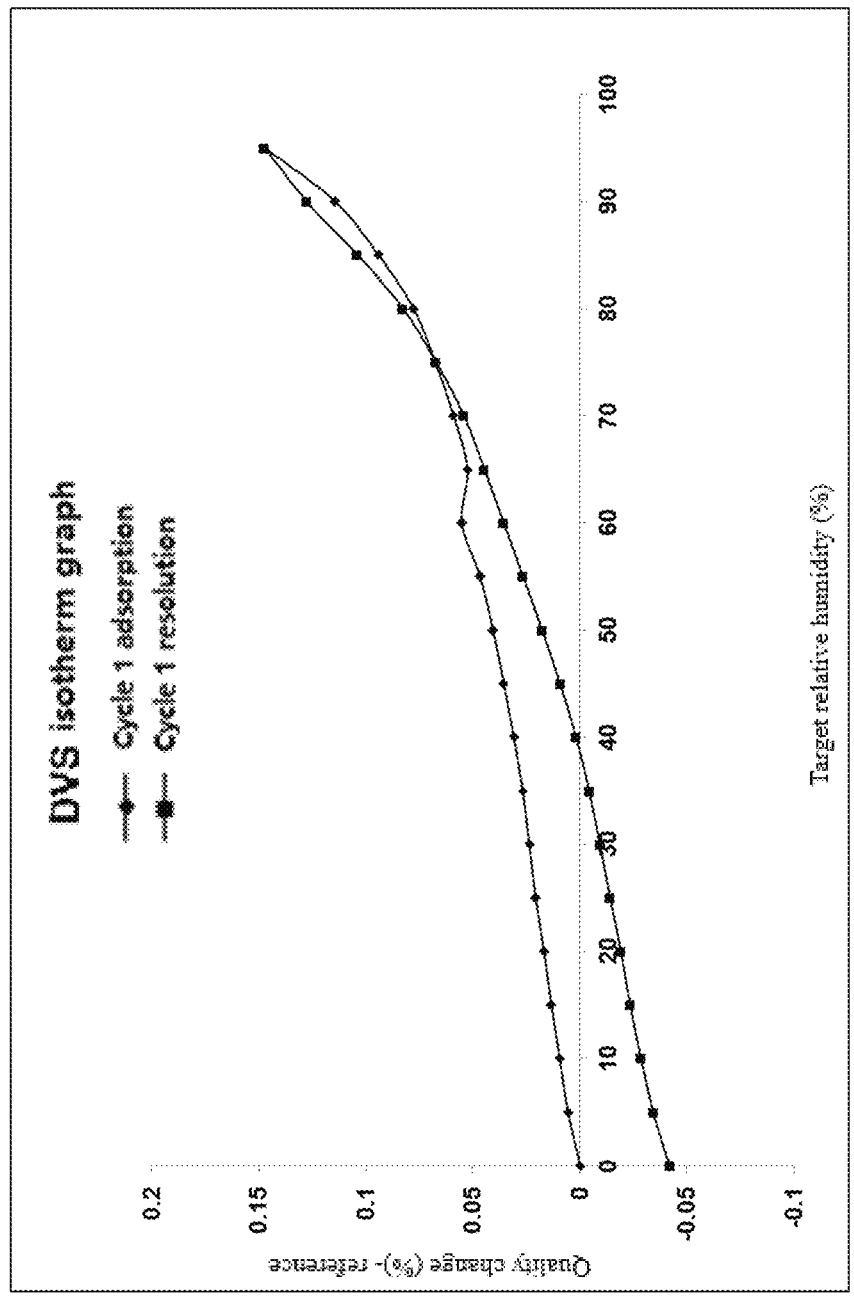
FIG. 7 is a Dynamic Vapor Sorption (DVS) graph of the crystal form A of the compound having Formula (I) prepared according to the method of Example 1 of the present invention.

Example 4 the Hygroscopicity Test of the Crystal Form A of the Present Invention An appropriate amount of the test sample was taken and the hygroscopicity of the test sample was tested by dynamic moisture adsorption device. Results were as shown in FIG. 7. It's demonstrated from the test results that the crystal form A of the present invention has a weight gain of less than 0.1% after equilibrium under the condition of a relative humidity of 80%. According to the criterion for the hygroscopic weight gain, it has no or almost none hygroscopicity. That is, the crystal form A of the invention is not easily deliquescent under the influence of high humidity.

The foregoing description is merely a basic illustration of the present invention and any equivalent transformation made in accordance with the technical solution of the present invention is intended to be within the scope of the present invention.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the above terms throughout this specification are not necessarily referring to the same embodiment or example of the present disclosure. Furthermore, the particular features, structures, materials, or characteristics may be combined in any suitable manner in one or more embodiments or examples. In addition, those skilled in the art can integrate and combine different embodiments, examples or the features of them as long as they are not contradictory to one another.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A crystal form of a compound having Formula (I), wherein the crystal form is crystal form A,

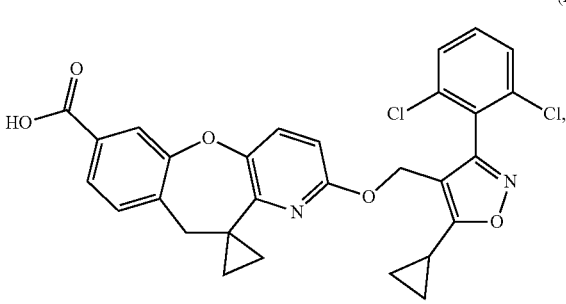

(I)

wherein the crystal form A exhibits the following characteristic X-ray powder diffraction pattern comprising peaks expressed as 2θ at 11.11°±0.2°, 14.07°±0.2°, 20.37°±0.2°, 21.00°±0.2°, 22.59°±0.2°, 22.86°±0.2°, 23.32°±0.2°, 24.85°±0.2°, 25.57°±0.2°, 26.11°±0.2°, 26.30°±0.2°, 28.92°±0.2°, 38.74°±0.2°.

2. The crystal form according to claim 1, wherein the crystal form A exhibits the following characteristic X-ray powder diffraction pattern comprising peaks expressed as 2θ at 7.22°±0.2°, 8.65°±0.2°, 11.11°±0.2°, 12.61°±0.2°, 12.92°±0.2°, 13.86°±0.2°, 14.07°±0.2°, 14.37°±0.2°, 15.94°±0.2°, 16.68°±0.2°, 17.29°±0.2°, 18.95°±0.2°, 19.90°±0.2°, 20.37°±0.2°, 20.89°±0.2°, 21.00°±0.2°, 21.60°±0.2°, 22.24°±0.2°, 22.59°±0.2°, 22.86°±0.2°, 23.32°±0.2°, 24.28°±0.2°, 24.85°±0.2°, 25.29°±0.2°, 25.57°±0.2°, 26.11°±0.2°, 26.30°±0.2°, 26.77°±0.2°, 27.62°±0.2°, 27.94°±0.2°, 28.15°±0.2°, 28.92°±0.2°, 30.61°±0.2°, 31.13°±0.2°, 31.41°±0.2°, 32.14°±0.2°, 33.65°±0.2°, 34.39°±0.2°, 34.73°±0.2°, 35.54°±0.2°, 36.38°±0.2°, 36.80°±0.2°, 37.76°±0.2°, 38.24°±0.2°, 38.74°±0.2°, 39.48°±0.2°, 40.08°±0.2°, 40.59°±0.2°, 42.34°±0.2°, 43.30°±0.2°, 43.99°±0.2°, 44.53°±0.2°, 45.29°±0.2°, 46.10°±0.2°, 47.83°+0.2°, 48.64°±0.2°, 49.91°±0.2°, 51.75°+0.2°, 54.43°+0.2°, 58.46°±0.2°.

3. The crystal form according to claim 1, wherein the crystal form A has an X-ray powder diffraction pattern comprising peaks substantially as shown in FIG. 1.

4. A crystal form of a compound having Formula (I), wherein the crystal form is crystal form A,

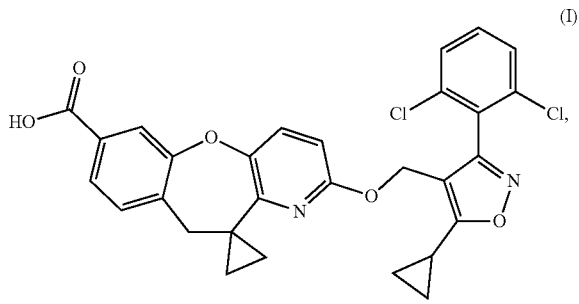 [SMILES: O=C(O)c1ccc2c(c1)Oc1ccc(OCc3c(-c4c(Cl)cccc4Cl)noc3C3CC3)nc1C1(CC1)C2]

(I)

wherein the crystal form A has a differential scanning calorimetry thermogram comprising an endothermic peak at 196.35° C.±3° C.

5. The crystal form according to claim 4, wherein the crystal form A has a differential scanning calorimetry thermogram substantially as shown in FIG. 2.

6. A pharmaceutical composition comprising the crystal form of claim 1, and a pharmaceutically acceptable carrier, excipient, diluent, adjuvant or a combination thereof.

7. A method for treating or lessening a disease mediated by FXR in a patient, comprising administering a pharmaceutically acceptable effective dose of the crystal form of claim 1, wherein
the disease mediated by FXR is cardiovascular and cerebrovascular disease, a disease related to dyslipidemia, metabolic syndrome, hyperproliferative disease, fibrosis, inflammatory disease or a disease related to liver and gallbladder and wherein cardiovascular and cerebrovascular disease is atherosclerosis, acute myocardial infarction, venous occlusive disease, portal hypertension, pulmonary hypertension, heart failure, peripheral arterial occlusive disease, sexual dysfunction, stroke or thrombosis;
in the metabolic syndrome is insulin resistance, hyperglycemia, hyperinsulinemia, elevated levels of fatty acid or glycerol in the blood, hyperlipidemia, obesity, hypertriglyceridemia, hypercholesterolemia, syndrome X, diabetic complications, atherosclerosis, hypertension, acute anemia, neutropenia, dyslipidemia, type II diabetes, diabetic nephropathy, diabetic neuropathy, diabetic retinopathy, dyslipidemia, or comorbidities of diabetes and abnormally high body mass index;
the hyperproliferative disease is hepatocellular carcinoma, colonic adenocarcinoma, polyposis, colonic adenocarcinoma, breast cancer, membrane adenocarcinoma, Barrett's esophagus cancer, or other forms of gastrointestinal or liver neoplastic diseases; and,
the fibrosis, inflammatory disease or disease related to liver and gallbladder is non-alcoholic fatty liver, non-alcoholic steatohepatitis, cholestasis, liver fibrosis, primary biliary cirrhosis, primary sclerosing cholangitis, progressive familial intrahepatic cholestasis, cystic fibrosis, drug-induced bile duct damage, gallstones, liver cirrhosis, hepatitis B, sebaceous gland disease, alcohol-induced liver cirrhosis, bile duct obstruction, gallstone disease, colitis, neonatal Jaundice, nuclear jaundice, or overgrowth of intestinal bacteria.

8. A method for treating or lessening a disease mediated by FXR in a patient, comprising administering a pharmaceutically acceptable effective dose of the pharmaceutical composition of claim 6, wherein
the disease mediated by FXR is cardiovascular and cerebrovascular disease, a disease related to dyslipidemia, metabolic syndrome, hyperproliferative disease, fibrosis, inflammatory disease or a disease related to liver and gallbladder,
the cardiovascular and cerebrovascular disease is atherosclerosis, acute myocardial infarction, venous occlusive disease, portal hypertension, pulmonary hypertension, heart failure, peripheral arterial occlusive disease, sexual dysfunction, stroke or thrombosis;
the metabolic syndrome is insulin resistance, hyperglycemia, hyperinsulinemia, elevated levels of fatty acid or glycerol in the blood, hyperlipidemia, obesity, hypertriglyceridemia, hypercholesterolemia, syndrome X, diabetic complications, atherosclerosis, hypertension, acute anemia, neutropenia, dyslipidemia, type II diabetes, diabetic nephropathy, diabetic neuropathy, diabetic retinopathy, dyslipidemia, or comorbidities of diabetes and abnormally high body mass index;
the hyperproliferative disease is hepatocellular carcinoma, colonic adenocarcinoma, polyposis, colonic adenocarcinoma, breast cancer, membrane adenocarcinoma, Barrett's esophagus cancer, or other forms of gastrointestinal or liver neoplastic diseases; and
the fibrosis, inflammatory disease or disease related to liver and gallbladder is non-alcoholic fatty liver, non-alcoholic steatohepatitis, cholestasis, liver fibrosis, primary biliary cirrhosis, primary sclerosing cholangitis, progressive familial intrahepatic cholestasis, cystic fibrosis, drug-induced bile duct damage, gallstones, liver cirrhosis, hepatitis B, sebaceous gland disease, alcohol-induced liver cirrhosis, bile duct obstruction, gallstone disease, colitis, neonatal Jaundice, nuclear jaundice, or overgrowth of intestinal bacteria.

9. A pharmaceutical composition comprising the crystal form of claim 4, and a pharmaceutically acceptable carrier, excipient, diluent, adjuvant or a combination thereof.

10. A method for treating or lessening a disease mediated by FXR in a patient, comprising administering a pharmaceutically acceptable effective dose of the crystal form of claim 4, wherein
the disease mediated by FXR is cardiovascular and cerebrovascular disease, a disease related to dyslipidemia, metabolic syndrome, hyperproliferative disease, fibrosis, inflammatory disease or a disease related to liver and gallbladder;
the cardiovascular and cerebrovascular disease is atherosclerosis, acute myocardial infarction, venous occlusive disease, portal hypertension, pulmonary hypertension, heart failure, peripheral arterial occlusive disease, sexual dysfunction, stroke or thrombosis;
the metabolic syndrome is insulin resistance, hyperglycemia, hyperinsulinemia, elevated levels of fatty acid or glycerol in the blood, hyperlipidemia, obesity, hypertriglyceridemia, hypercholesterolemia, syndrome X, diabetic complications, atherosclerosis, hypertension, acute anemia, neutropenia, dyslipidemia, type II diabetes, diabetic nephropathy, diabetic neuropathy, diabetic retinopathy, dyslipidemia, or comorbidities of diabetes and abnormally high body mass index;
the hyperproliferative disease is hepatocellular carcinoma, colonic adenocarcinoma, polyposis, colonic adenocarcinoma, breast cancer, membrane adenocarcinoma, Barrett's esophagus cancer, or other forms of gastrointestinal or liver neoplastic diseases; and
the fibrosis, inflammatory disease or disease related to liver and gallbladder is non-alcoholic fatty liver, non-alcoholic steatohepatitis, cholestasis, liver fibrosis, primary biliary cirrhosis, primary sclerosing cholangitis, progressive familial intrahepatic cholestasis, cystic fibrosis, drug-induced bile duct damage, gallstones, liver cirrhosis, hepatitis B, sebaceous gland disease, alcohol-induced liver cirrhosis, bile duct obstruction, gallstone disease, colitis, neonatal Jaundice, nuclear jaundice, or overgrowth of intestinal bacteria.

11. A method for treating or lessening a disease mediated by FXR in a patient, comprising administering a pharmaceutically acceptable effective dose of the pharmaceutical composition of claim 9, wherein
the disease mediated by FXR is cardiovascular and cerebrovascular disease, a disease related to dyslipidemia, metabolic syndrome, hyperproliferative disease, fibrosis, inflammatory disease or a disease related to liver and gallbladder;
the cardiovascular and cerebrovascular disease is atherosclerosis, acute myocardial infarction, venous occlusive disease, portal hypertension, pulmonary hypertension, heart failure, peripheral arterial occlusive disease, sexual dysfunction, stroke or thrombosis;
the metabolic syndrome is insulin resistance, hyperglycemia, hyperinsulinemia, elevated levels of fatty acid or glycerol in the blood, hyperlipidemia, obesity, hypertriglyceridemia, hypercholesterolemia, syndrome X, diabetic complications, atherosclerosis, hypertension, acute anemia, neutropenia, dyslipidemia, type II diabetes, diabetic nephropathy, diabetic neuropathy, diabetic retinopathy, dyslipidemia, or comorbidities of diabetes and abnormally high body mass index; and
the hyperproliferative disease is hepatocellular carcinoma, colonic adenocarcinoma, polyposis, colonic adenocarcinoma, breast cancer, membrane adenocarcinoma, Barrett's esophagus cancer, or other forms of gastrointestinal or liver neoplastic diseases; wherein the fibrosis, inflammatory disease or disease related to liver and gallbladder is non-alcoholic fatty liver, non-alcoholic steatohepatitis, cholestasis, liver fibrosis, primary biliary cirrhosis, primary sclerosing cholangitis, progressive familial intrahepatic cholestasis, cystic fibrosis, drug-induced bile duct damage, gallstones, liver cirrhosis, hepatitis B, sebaceous gland disease, alcohol-induced liver cirrhosis, bile duct obstruction, gallstone disease, colitis, neonatal Jaundice, nuclear jaundice, or overgrowth of intestinal bacteria.

* * * * *